(12) United States Patent
Hara et al.

(10) Patent No.: US 11,414,070 B2
(45) Date of Patent: *Aug. 16, 2022

(54) PARKING ASSIST SYSTEM

(71) Applicant: HONDA MOTOR CO., LTD., Tokyo (JP)

(72) Inventors: Yuki Hara, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/207,834

(22) Filed: Mar. 22, 2021

(65) Prior Publication Data

US 2021/0300336 A1 Sep. 30, 2021

(30) Foreign Application Priority Data

Mar. 26, 2020 (JP) .............................. JP2020-056791

(51) Int. Cl.
*H04N 5/44* (2011.01)
*B60W 30/06* (2006.01)
*B60W 50/14* (2020.01)
*G08G 1/16* (2006.01)
*B60W 10/18* (2012.01)
*G06V 20/58* (2022.01)

(52) U.S. Cl.
CPC ............ *B60W 30/06* (2013.01); *B60W 10/18* (2013.01); *B60W 50/14* (2013.01); *G06V 20/58* (2022.01); *G08G 1/168* (2013.01); *B60W 2050/146* (2013.01)

(58) Field of Classification Search
CPC ...... B60W 30/06; B60W 10/18; B60W 50/14; B60W 2050/146; G06K 9/00805; G06K 9/00812; G08G 1/168
See application file for complete search history.

(56) References Cited

U.S. PATENT DOCUMENTS

| | | |
|---|---|---|
| 6,433,679 B1 * | 8/2002 | Schmid .................. B60Q 9/007 340/436 |
| 2009/0085771 A1 * | 4/2009 | Wu ..................... B62D 15/0285 348/148 |
| 2015/0302750 A1 * | 10/2015 | Choi ...................... G08G 1/141 340/932.2 |
| 2017/0123421 A1 * | 5/2017 | Kentley .................. G06Q 10/00 |
| 2018/0315312 A1 * | 11/2018 | Hayakawa ............. G08G 1/143 |
| 2019/0009773 A1 * | 1/2019 | Miyahara ............. B62D 15/028 |
| 2020/0189569 A1 * | 6/2020 | Awan ...................... H04W 4/80 |
| 2020/0282975 A1 * | 9/2020 | Minase .............. B62D 15/0285 |

FOREIGN PATENT DOCUMENTS

JP 2020011559 A 1/2020

* cited by examiner

*Primary Examiner* — Munear T Akki
(74) *Attorney, Agent, or Firm* — Armstrong Teasdale LLP

(57) ABSTRACT

A parking assist system includes an acquiring unit, a display unit, and a control unit. In a case where the acquiring unit acquires information about an obstacle on a first target route during traveling of a vehicle along the first target route and thus the vehicle stops traveling along the first target route, the control unit tries to calculate a second target route to a target position from a position where the vehicle stops traveling along the first target route. Upon failing to calculate the second target route, the control unit prohibits a notification about automatic parking while a user is performing a brake operation of the vehicle.

7 Claims, 7 Drawing Sheets

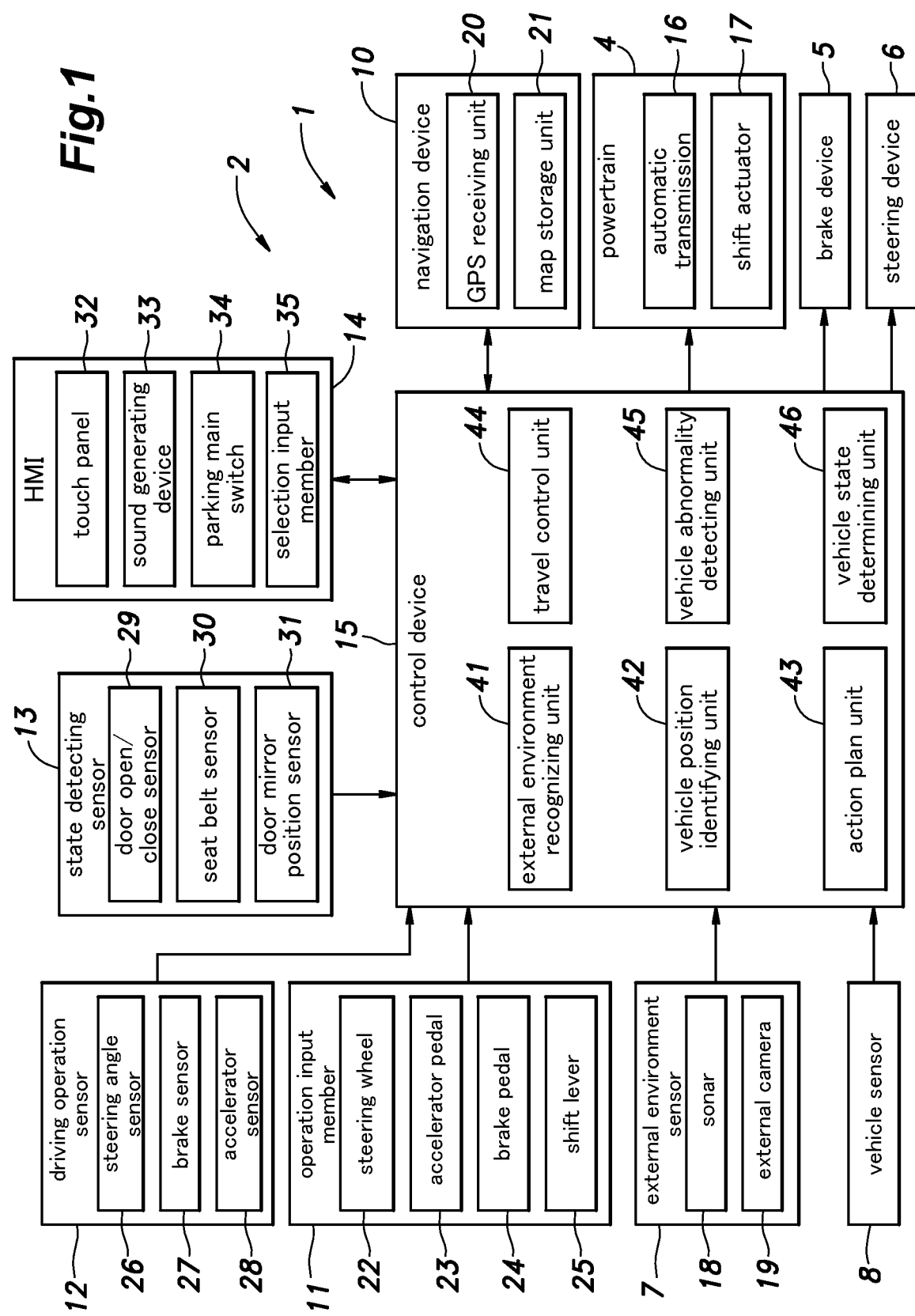

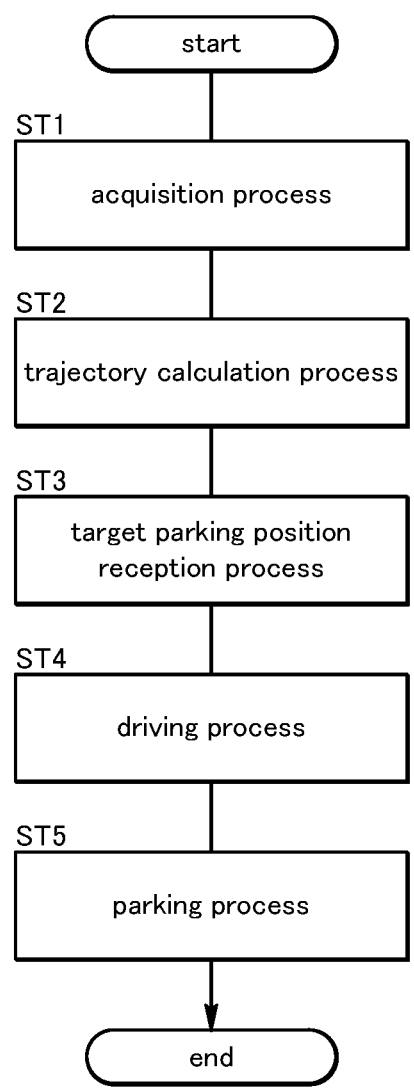

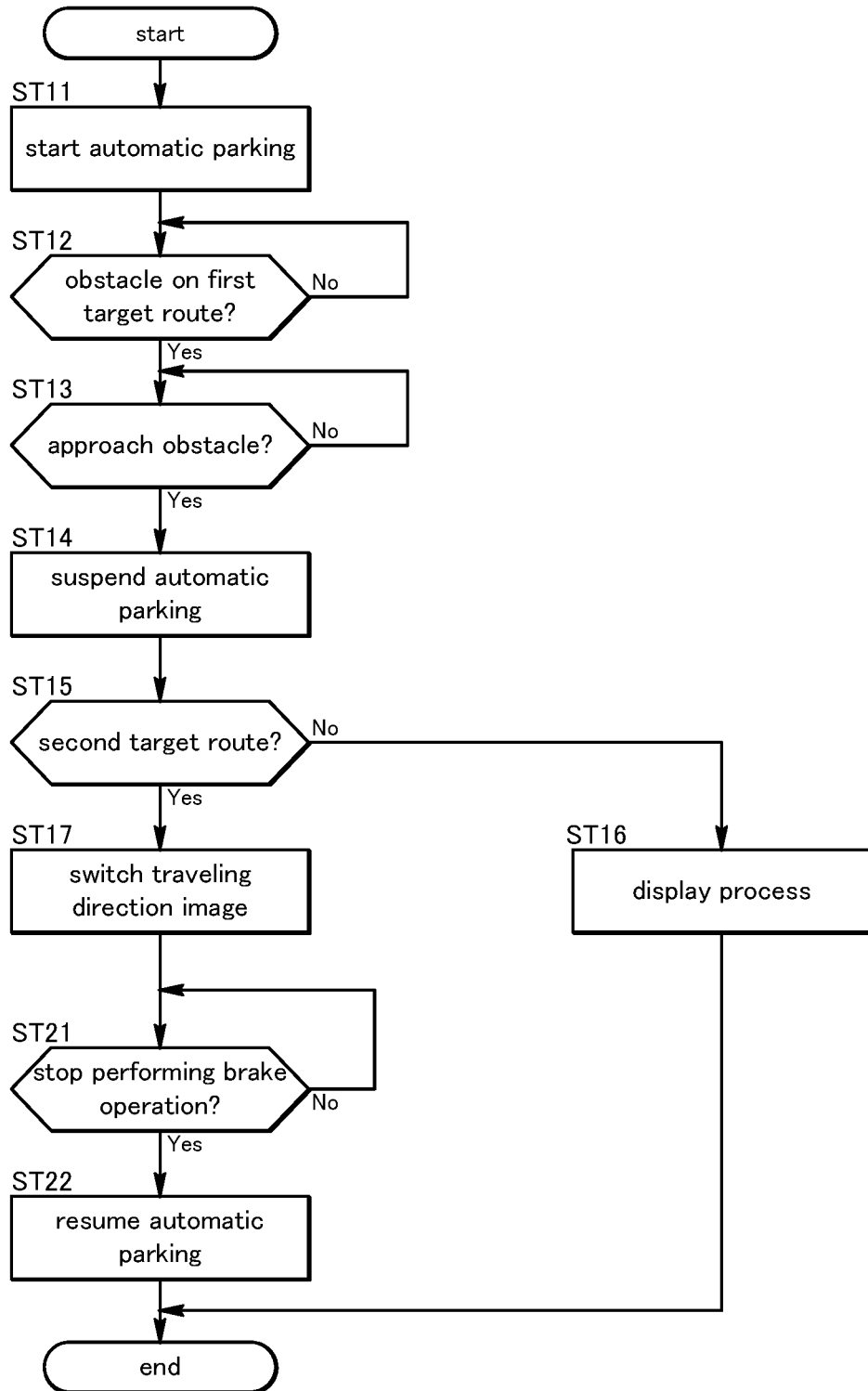

PARKING ASSIST SYSTEM

TECHNICAL FIELD

The present invention relates to a parking assist system.

BACKGROUND ART

Conventionally, there is a parking assist system configured to execute automatic parking for autonomously moving a vehicle to a target position. For example, such a parking assist system includes an acquiring unit configured to acquire surrounding information about surroundings of the vehicle and a control unit configured to calculate a target route of the vehicle and to cause the vehicle to travel along the target route.

For example, JP2020-11559A discloses a vehicle control device including an environment recognizing device configured to acquire information about an environment around an own vehicle, a route generating unit configured to generate a parking route for moving the own vehicle from a current position to a target parking position, and a vehicle control unit configured to control the own vehicle along the parking route generated by the route generating unit.

In the parking assist system as described above, the acquiring unit may acquire information about an obstacle on the target route while the vehicle is traveling along the target route, and thus the vehicle may stop traveling along the target route before reaching the target position. In such a case, if a notification about the automatic parking (for example, a notification about the presence of the obstacle) is given even though the user is aware of the obstacle on the target route, the user may be annoyed.

SUMMARY OF THE INVENTION

In view of such a problem of the prior art, a primary object of the present invention is to provide a parking assist system that can prevent the user from being annoyed in a case where the vehicle stops traveling along the target route due to the presence of the obstacle.

To achieve such an object, one embodiment of the present invention provides a parking assist system (1) configured to execute automatic parking for autonomously moving a vehicle to a target position, the parking assist system including: an acquiring unit (7) configured to acquire surrounding information about surroundings of the vehicle; a display unit (32) configured to display the surrounding information acquired by the acquiring unit; and a control unit (15) configured to calculate a first target route to the target position based on the surrounding information acquired by the acquiring unit and to cause the vehicle to travel along the first target route, wherein in a case where the acquiring unit acquires information about an obstacle on the first target route during traveling of the vehicle along the first target route and thus the vehicle stops traveling along the first target route, the control unit tries to calculate a second target route to the target position from a position where the vehicle stops traveling along the first target route, and upon failing to calculate the second target route, the control unit prohibits a notification about the automatic parking while a user is performing a brake operation of the vehicle.

According to this arrangement, upon failing to calculate the second target route, the control unit does not give the notification about the automatic parking while the user is performing the brake operation of the vehicle on the presumption that the user is aware of the obstacle on the first target route. Accordingly, it is possible to prevent the notification about the automatic parking from being given even though the user is aware of the obstacle on the first target route, thereby preventing the user from being annoyed.

In the above arrangement, preferably, upon failing to calculate the second target route, the control unit gives the notification about the automatic parking at least on condition that the user is not performing the brake operation of the vehicle.

According to this arrangement, it is possible to improve the safety of the vehicle by giving the notification about the automatic parking.

In the above arrangement, preferably, upon failing to calculate the second target route, the control unit determines whether a non-performance period during which the user does not perform the brake operation of the vehicle continues for a prescribed period or more, and upon determining that the non-performance period continues for the prescribed period or more, the control unit gives the notification about the automatic parking.

In a case where the non-performance period continues for the prescribed period or more, the user may not be monitoring the surroundings of the vehicle even though the obstacle is present on the first target route. According to the above arrangement, it is possible to further improve the safety of the vehicle by giving the notification about the automatic parking in consideration of the possibility of such a situation. Further, the notification about the automatic parking is given on condition that the non-performance period continues for the prescribed period or more (namely, the user does not perform the brake operation for the prescribed period or more), thereby preventing the notification about the automatic parking from being given at an excessively early timing after the user stops performing the brake operation. Accordingly, it is possible to more effectively prevent the user from being annoyed.

In the above arrangement, preferably, upon determining that the non-performance period continues for the prescribed period or more, the control unit gives a promotion notification (51) as the notification about the automatic parking, the promotion notification promoting the brake operation of the vehicle.

According to this arrangement, it is possible to improve the safety of the vehicle by promoting the brake operation of the vehicle by the user.

In the above arrangement, preferably, in a case where the user performs the brake operation of the vehicle in response to the promotion notification, the control unit gives a resumption selection notification (53) in which the user can select resumption of the automatic parking.

According to this arrangement, in a case where the user performs the brake operation of the vehicle in response to the promotion notification, it is possible to cause the user to select whether to resume the automatic parking by giving the resumption selection notification. Accordingly, it is possible to resume the automatic parking based on the user's intention, thereby improving the safety of the vehicle.

In the above arrangement, preferably, upon failing to calculate the second target route, the control unit determines whether a non-performance period during which the user does not perform the brake operation of the vehicle continues for a prescribed period or more, and in a case where the control unit determines that the non-performance period does not continue for the prescribed period or more and the acquiring unit stops acquiring the information about the obstacle on the first target route, the control unit resumes the automatic parking at least on condition that the user stops performing the brake operation of the vehicle.

According to this arrangement, in a case where the obstacle is no longer present on the first target route and the user stops performing the brake operation of the vehicle, it is possible to resume the automatic parking without resetting the target route. Accordingly, it is possible to improve the convenience of the user.

In the above arrangement, preferably, upon failing to calculate the second target route, the control unit prohibits a notification about presence of the obstacle on the first target route while the user is performing the brake operation of the vehicle.

According to this arrangement, upon failing to calculate the second target route, the control unit does not give the notification about the presence of the obstacle on the first target route while the user is performing the brake operation of the vehicle on the presumption that the user is aware of the obstacle on the first target route. Accordingly, it is possible to prevent the notification about the presence of the obstacle on the first target route from being given even though the user is aware of the obstacle on the first target route, thereby more effectively preventing the user from being annoyed.

In the above arrangement, preferably, even if the control unit fails to calculate the second target route and the acquiring unit keeps on acquiring the information about the obstacle on the first target route, the control unit prohibits the notification about the presence of the obstacle on the first target route while the user is performing the brake operation of the vehicle.

According to this arrangement, even if the control unit fails to calculate the second target route and the acquiring unit keeps on acquiring the information about the obstacle on the first target route, the control unit does not give the notification about the presence of the obstacle on the first target route while the user is performing the brake operation of the vehicle on the presumption that the user is aware of the obstacle on the first target route. Accordingly, it is possible to prevent the notification about the presence of the obstacle on the first target route from being given even though the user is aware of the obstacle on the first target route, thereby more effectively preventing the user from being annoyed.

Thus, according to the above arrangements, it is possible to provide a parking assist system that can prevent the user from being annoyed in a case where the vehicle stops traveling along the target route due to the presence of the obstacle.

BRIEF DESCRIPTION OF THE DRAWING(S)

FIG. 1 is a functional block diagram of a vehicle provided with a parking assist system according to an embodiment of the present invention;

FIG. 2 is a flowchart of an automatic parking process in the parking assist system according to the embodiment;

FIG. 7 is a flowchart showing a display process in a parking assist system according to another embodiment.

DESCRIPTION OF THE PREFERRED EMBODIMENT(S)

Figure 3A:
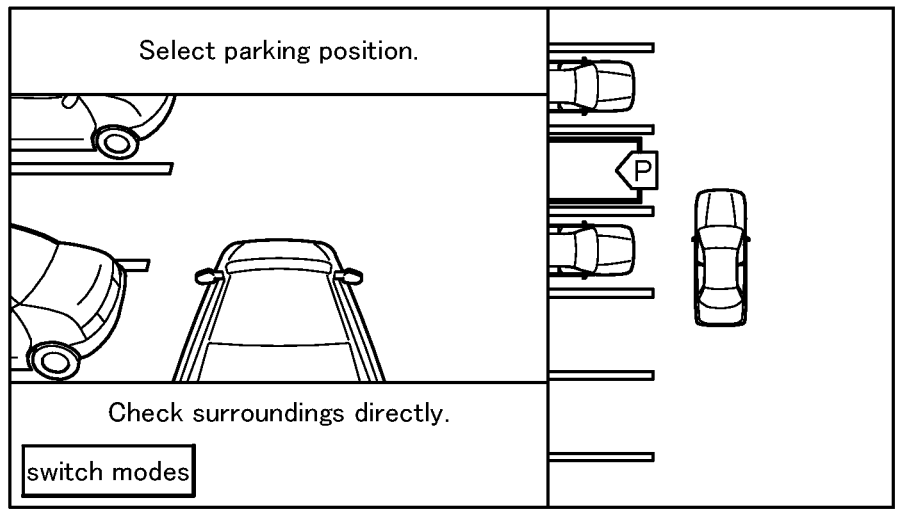
FIG. 3A is a diagram showing a screen display of a touch panel during a target parking position reception process in the parking assist system according to the embodiment.

In the following, an embodiment of the present invention will be described in detail with reference to the drawings.

A parking assist system 1 is mounted on a vehicle such as an automobile provided with a vehicle control system 2 configured to make the vehicle travel autonomously.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply a brake pressure (an oil pressure) to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external surrounding information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object, thereby detecting the position (distance and direction) of the object. Plural sonars 18 are provided at each of a rear portion and a front portion of the vehicle. In the present embodiment, a pair of sonars 18 are provided on a rear bumper so as to be spaced laterally from each other, a pair of sonars 18 are provided on a front bumper so as to be spaced laterally from each other, and four sonars 18 are provided at front and rear ends of both lateral surfaces of the vehicle, respectively. Namely, the vehicle is provided with eight sonars 18 in total. The sonars 18 provided on the rear bumper mainly detect the positions of the objects behind the vehicle. The sonars 18 provided on the front bumper mainly detect the positions of the objects in front of the vehicle. The sonars 18 provided at the front ends of both lateral surfaces of the vehicle detect the positions of the objects on left and right outsides of the front end of the vehicle, respectively. The sonars 18 provided at the rear ends of both lateral surfaces of the vehicle detect the positions of the objects on left and right outsides of the rear end of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the vehicle speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the vehicle speed sensor consists of plural wheel speed sensors. Each wheel speed sensor is configured to detect the wheel speed (the rotational speed of each wheel). For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a turning angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the traveling direction as viewed from above. The control device 15 may generate the look-down image by combining the images of the front camera, the rear camera, and the left and right side cameras, and may generate the bird's-eye image by combining the image captured by the front camera or the rear camera facing the traveling direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the external environment sensor 7 (an example of an acquiring unit) configured to acquire an image in the traveling direction of the vehicle and information about an obstacle (an example of surrounding information about surroundings of the vehicle), the touch panel 32 (an example of a display unit) configured to display the image in the traveling direction of the vehicle acquired by the external environment sensor 7, and the control device 15 (an example of a control unit) configured to calculate a trajectory of the vehicle to the target position based on the information about the obstacle acquired by the external environment sensor 7 and to cause the vehicle to travel along the calculated trajectory.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a vehicle stopper (wheel stopper) or an obstacle is present, and obtains the size of the vehicle stopper or the obstacle in a case where the vehicle stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the traveling direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
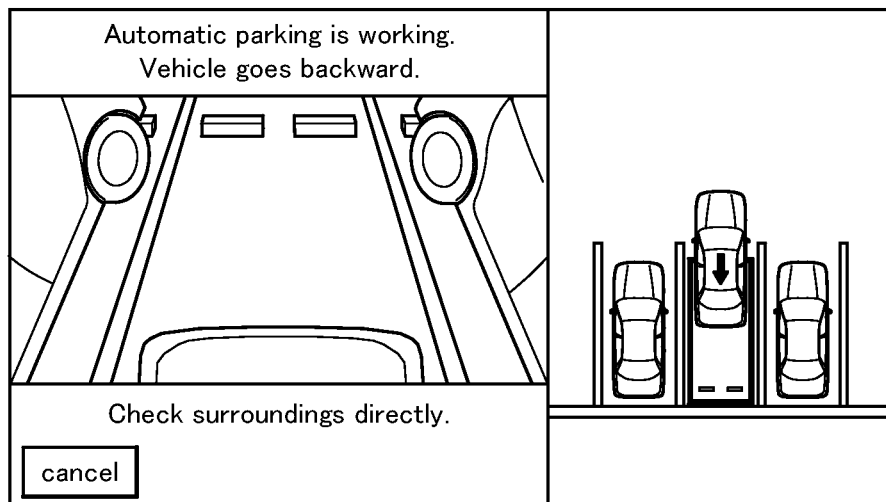
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the traveling direction of the vehicle (hereinafter referred to as "traveling direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the traveling direction of the vehicle (a reversing operation for reversing the traveling direction of the vehicle). The switching operation may be executed repeatedly, or may be executed only once.

During the driving process, the action plan unit 43 may acquire the traveling direction image from the external cameras 19 and make the touch panel 32 display the acquired traveling direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
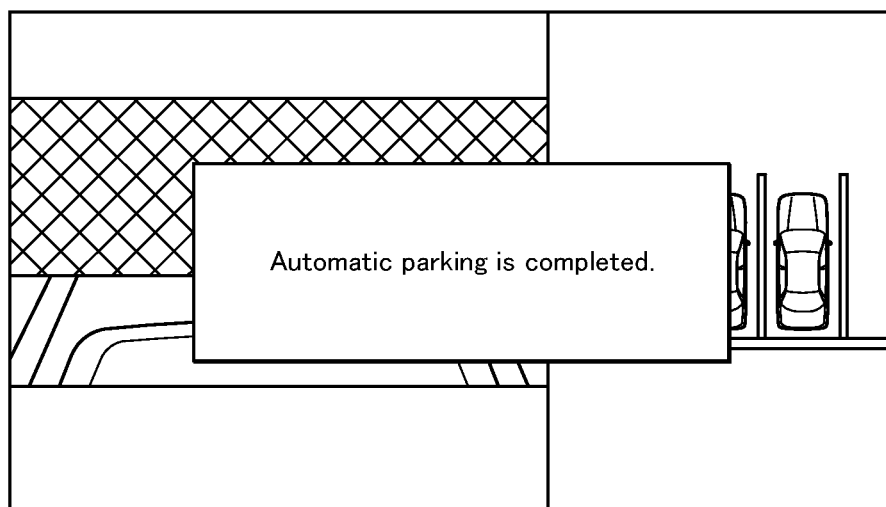
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof <The Driving Process>

Next, with reference to FIG. 4 and FIGS. 5A to 5C, the driving process (step ST4) of the above-mentioned automatic parking process will be further described.

Figure 4:
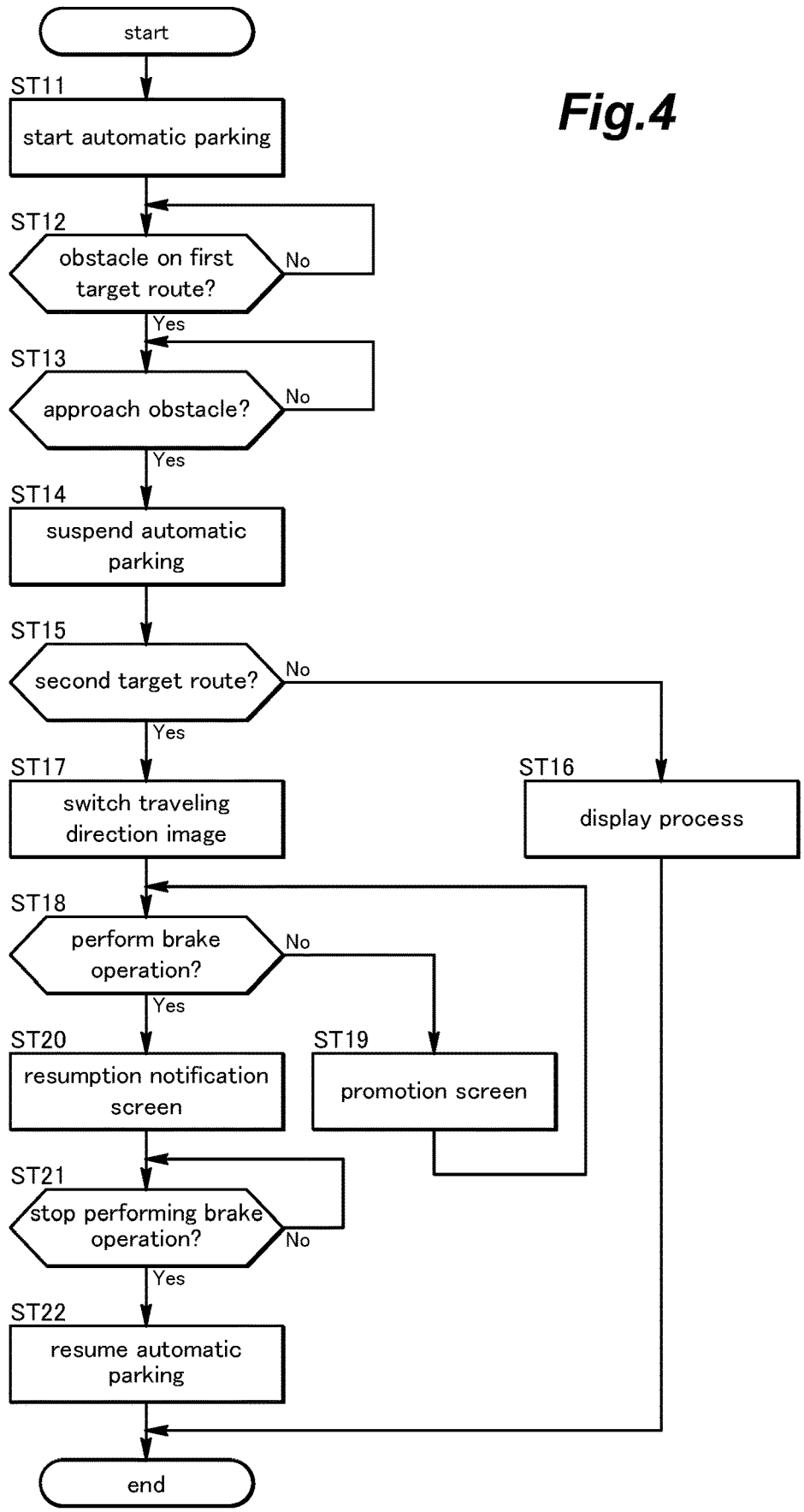
FIG. 4 is a flowchart showing the driving process in the parking assist system according to the embodiment.

With reference to FIG. 4, when the driving process is started, the automatic parking is also started (step ST11). When the automatic parking is started in this way, the action plan unit 43 causes the vehicle to start traveling along a first target route. The first target route is a route (trajectory) from a start position of the automatic parking to the target position, and is calculated so as to avoid the obstacle detected by the external environment sensor 7. Further, when the automatic parking is started as described above, the action plan unit 43 causes the touch panel 32 to display an image (hereinafter referred to as "the traveling direction image") in the traveling direction of the vehicle.

Next, the external environment recognizing unit 41 determines whether the obstacle is present on the first target route (step ST12). For example, in a case where the external environment sensor 7 detects the obstacle on the first target route, the external environment recognizing unit 41 determines that the obstacle is present on the first target route. On the other hand, in a case where the external environment sensor 7 does not detect the obstacle on the first target route, the external environment recognizing unit 41 determines that the obstacle is not present on the first target route. Incidentally, the determination in step ST12 becomes "No" except for a case where a specific obstacle (for example, an obstacle that has not been present on the first target route at the calculation of the first target route or an obstacle that has not been detected by the external environment sensor 7 at the calculation of the first target route) is present.

In a case where the determination in step ST12 is "No" (in a case where the obstacle is not present on the first target route), the external environment recognizing unit 41 repeats the determination in step ST12 while the vehicle keeps on traveling along the first target route. Incidentally, in a case where the vehicle keeps on traveling along the first target route in this way and consequently reaches the target position, the driving process ends.

On the other hand, in a case where the determination in step ST12 is Yes (in a case where the obstacle is present on the first target route), the external environment recognizing unit 41 determines whether the vehicle has approached the obstacle on the first target route (step ST13). For example, while the distance between the vehicle and the obstacle detected by the external environment sensor 7 is equal to or more than a prescribed threshold, the external environment recognizing unit 41 determines that the vehicle has not approached the obstacle. On the other hand, in a case where the distance between the vehicle and the obstacle detected by the external environment sensor 7 becomes less than the above threshold, the external environment recognizing unit 41 determines that the vehicle has approached the obstacle.

In a case where the determination in step ST13 is "No" (in a case where the vehicle has not approached the obstacle on the first target route), the external environment recognizing unit 41 repeats the determination in step ST13 while the vehicle keeps on traveling along the first target route. In another embodiment, in a case where the determination in step ST13 is "No", the external environment recognizing unit 41 may again determine whether the obstacle is present on the first target route (step ST12).

On the other hand, in a case where the determination in step ST13 is "Yes" (in a case where the vehicle has approached the obstacle on the first target route), the action plan unit 43 suspends the automatic parking and causes the vehicle to stop traveling along the first target route (step ST14). At this time, the action plan unit 43 may drive the shift actuator 17 to shift the shift position to the parking position, or may drive the parking brake device (not shown).

Next, the action plan unit 43 tries to calculate a second target route, which is different from the first target route (step ST15). The second target route is a route (trajectory) to the target position from a position where the vehicle stops traveling along the first target route in step ST14, and is calculated so as to avoid the obstacle on the first target route detected by the external environment sensor 7 in steps ST12 and ST13. For example, in a case where the action plan unit 43 can calculate the second target route whose length is equal to or less than a prescribed reference distance, the action plan unit 43 succeeds in calculating the second target route. On the other hand, in a case where it is physically impossible for the action plan unit 43 to calculate the second target route (for example, in a case where the obstacle is blocking the entrance to the target position) or in a case where the action plan unit 43 can only calculate the second target route whose length is more than the above reference distance, the action plan unit 43 fails to calculate the second target route.

In a case where the determination in step ST15 is "No" (in a case where the action plan unit 43 fails to calculate the second target route), the action plan unit 43 executes a display process (step ST16). The details of the display process will be described later.

On the other hand, in a case where the determination in step ST15 is "Yes" (in a case where the action plan unit 43 succeeds in calculating the second target route), the action plan unit 43 causes the touch panel 32 to switch the traveling direction image (step ST17). For example, in a case where the vehicle has been moving forward immediately before the vehicle stops traveling along the first target route, the traveling direction image is switched from an image in front of the vehicle to an image behind the vehicle. On the other hand, in a case where the vehicle has been moving backward immediately before the vehicle stops traveling along the first target route, the traveling direction image is switched from the image behind the vehicle to the image in front of the vehicle. Namely, the action plan unit 43 causes the touch panel 32 to display the traveling direction image in the direction opposite to the traveling direction of the vehicle immediately before the vehicle stops traveling along the first target route.

Next, the action plan unit 43 determines whether the driver (an example of the user) performs the brake operation of the vehicle (step ST18). For example, in a case where the pressing amount of the brake pedal 24 detected by the brake sensor 27 is equal to or more than a prescribed reference amount, the action plan unit 43 determines that the driver performs the brake operation of the vehicle. On the other hand, in a case where the pressing amount of the brake pedal 24 detected by the brake sensor 27 is less than the reference amount, the action plan unit 43 determines that the driver does not perform the brake operation of the vehicle.

Figure 5A:
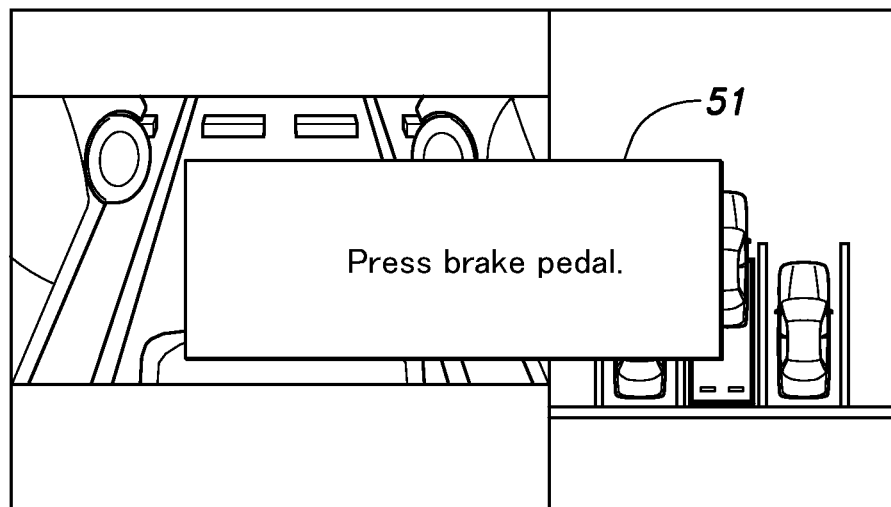
FIG. 5A is a diagram showing a promotion screen in the parking assist system according to the embodiment.

In a case where the determination in step ST18 is "No" (in a case where the driver does not perform the brake operation of the vehicle), the action plan unit 43 causes the touch panel 32 to display a promotion screen 51 shown in FIG. 5A (step ST19). The promotion screen 51 is a screen including a message promoting the brake operation of the vehicle. When step ST19 ends, the action plan unit 43 again determines whether the driver performs the brake operation of the vehicle while keeping on causing the touch panel 32 to display the promotion screen 51 (step ST18).

Figure 5B:
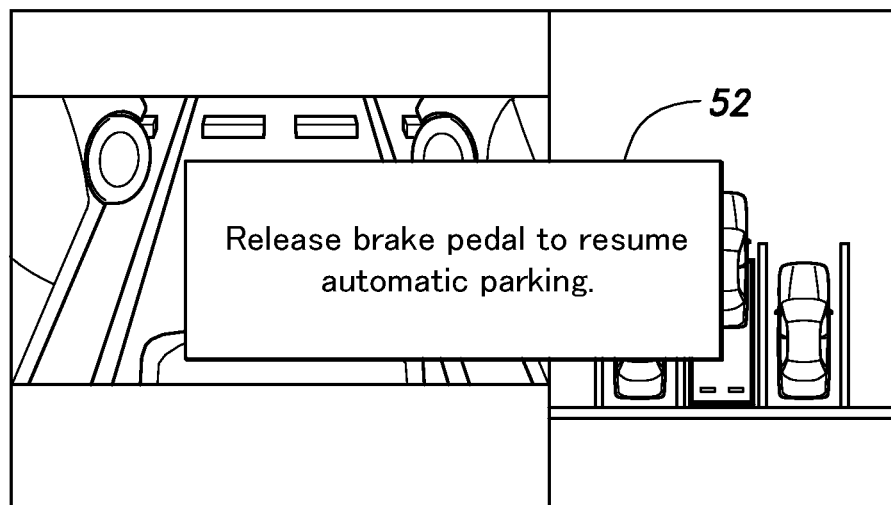
FIG. 5B is a diagram showing a resumption notification screen in the parking assist system according to the embodiment.
Figure 5C:
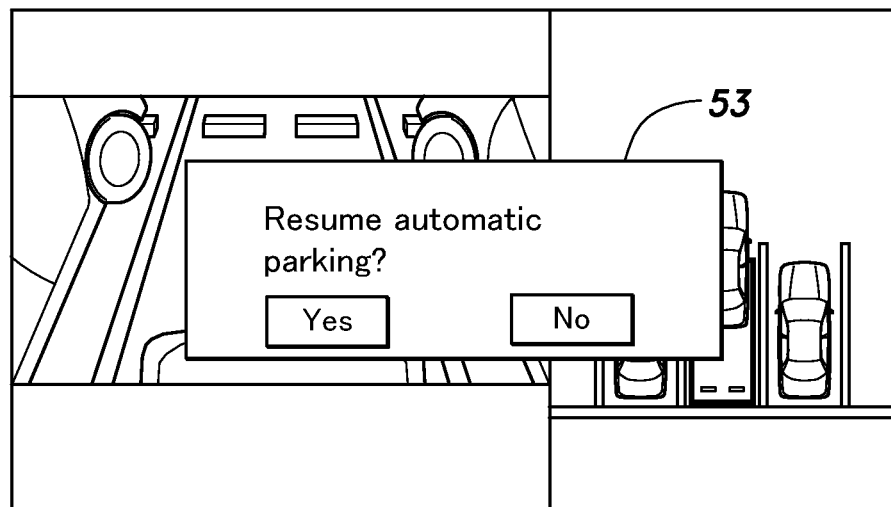
FIG. 5C is a diagram showing a resumption selection screen in the parking assist system according to the embodiment.

On the other hand, in a case where the determination in step ST18 is "Yes" (in a case where the driver performs the brake operation of the vehicle), the action plan unit 43 causes the touch panel 32 to display a resumption notification screen 52 shown in FIG. 5B (step ST20). The resumption notification screen 52 is a screen including a message notifying the driver that the automatic parking will be resumed when the driver stops performing the brake operation of the vehicle.

Next, the action plan unit 43 determines whether the driver stops performing the brake operation of the vehicle (step ST21). For example, in a case where the pressing amount of the brake pedal 24 detected by the brake sensor 27 becomes less than the reference amount, the action plan unit 43 determines that the driver stops performing the brake operation of the vehicle. On the other hand, in a case where the pressing amount of the brake pedal 24 detected by the brake sensor 27 is still equal to or more than the above reference amount, the action plan unit 43 determines that the driver does not stop performing the brake operation of the vehicle.

In a case where the determination in step ST21 is "No" (in a case where the driver does not stop performing the brake operation of the vehicle), the action plan unit 43 repeats the determination in step ST21 while the vehicle is stopped.

On the other hand, in a case where the determination in step ST21 is "Yes" (in a case where the driver stops performing the brake operation of the vehicle), the automatic parking is resumed (step ST22). When the automatic parking is resumed in this way, the action plan unit 43 causes the vehicle to start traveling along the second target route. When the vehicle starts traveling along the second target route in this way, the traveling direction of the vehicle is switched in order to move the vehicle away from obstacle on the first target route. In a case where the vehicle keeps on traveling along the second target route and consequently reaches the target position, the driving process ends.

<The Display Process>

Next, the display process (step ST16) in the above driving process will be further described with reference to FIGS. 5A to 5C and FIG. 6.

Figure 6:
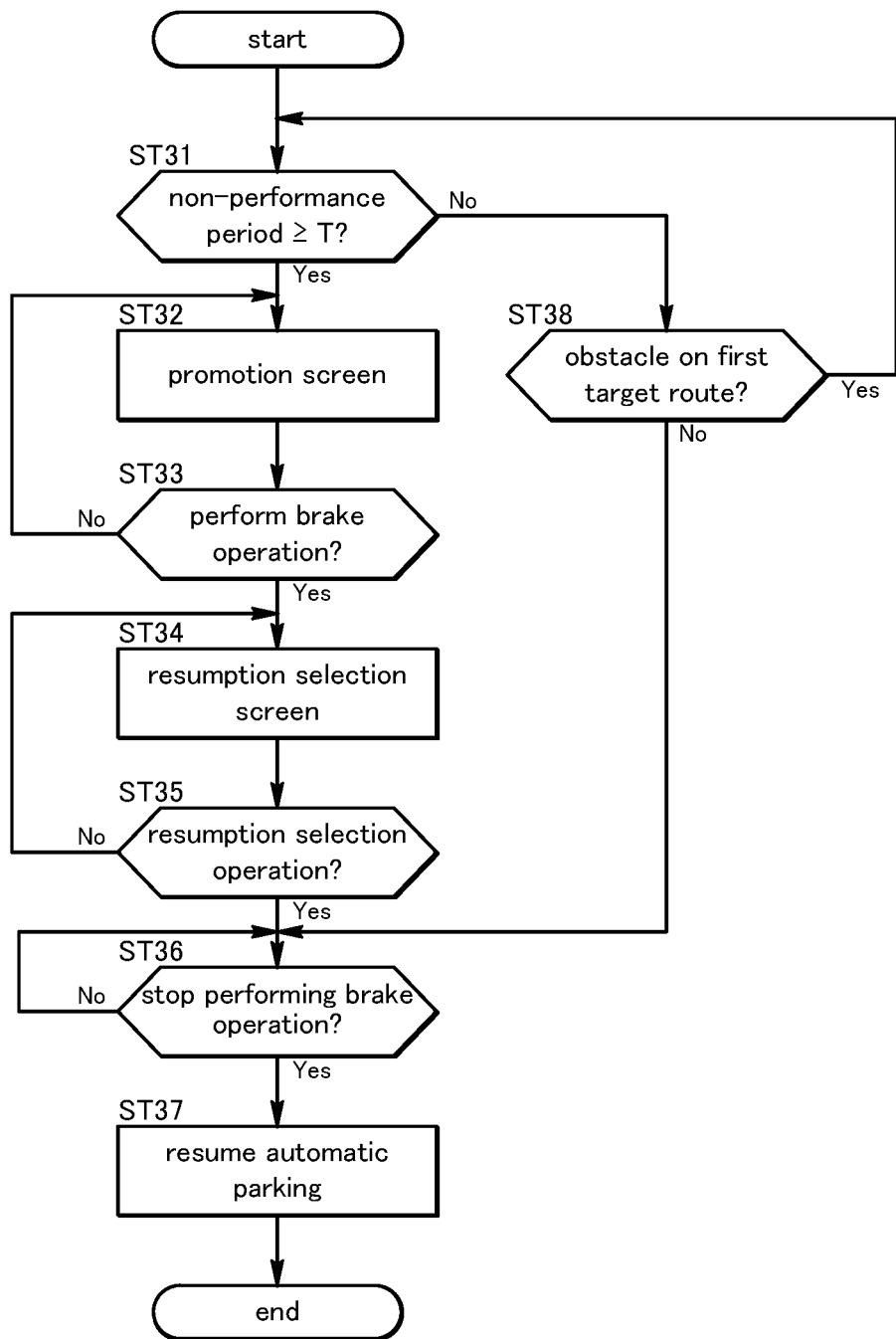
FIG. 6 is a flowchart showing a display process in the parking assist system according to the embodiment.

With reference to FIG. 6, when the display process is started, the action plan unit 43 determines whether a period (hereinafter referred to as "the non-performance period") during which the driver does not perform the brake operation of the vehicle continues for a prescribed period T or more (step ST31). For example, in a case where the pressing amount of the brake pedal 24 detected by the brake sensor 27 continuously falls below the reference amount for the prescribed period T or more, the action plan unit 43 determines that the non-performance period continues for the prescribed period T or more. On the other hand, in a case where the pressing amount of the brake pedal 24 detected by the brake sensor 27 becomes equal to or more than the above reference amount within the prescribed period T, the action plan unit 43 determines that the non-performance period does not continue for the prescribed period T or more.

In a case where the determination in step ST31 is "Yes" (in a case where the non-performance period continues for the prescribed period T or more), the action plan unit 43 causes the touch panel 32 to display the promotion screen 51 (an example of a promotion notification; see FIG. 5A) as a notification about the automatic parking (step ST32). As described above, the promotion screen 51 is a screen including a message promoting the brake operation of the vehicle.

Next, the action plan unit 43 determines whether the driver performs the brake operation of the vehicle (step ST33) in the same way as step ST18 described above.

In a case where the determination in step ST33 is "No" (in a case where the driver does not perform the brake operation of the vehicle), the action plan unit 43 repeats step ST32 and step ST33. Namely, the action plan unit 43 repeats the determination as to whether the driver performs the brake operation of the vehicle while causing the touch panel 32 to display the promotion screen 51.

On the other hand, in a case where the determination in step ST33 is "Yes" (in a case where the driver performs the brake operation of the vehicle), the action plan unit 43 causes the touch panel 32 to display a resumption selection screen 53 (an example of a resumption selection notification; see FIG. 5C) (step ST34). The resumption selection screen 53 is a screen on which the driver can select the resumption of the automatic parking.

Next, the action plan unit 43 determines whether an operation (hereinafter referred to as "the resumption selection operation") for selecting the resumption of the automatic parking is performed on the resumption selection screen 53 (step ST35). For example, in a case where a button ("Yes" in FIG. 5C) for selecting the resumption of the automatic parking is pressed on the resumption selection screen 53, the action plan unit 43 determines that the resumption selection operation is performed.

In a case where the determination in step ST35 is "No" (in a case where the resumption selection operation is not performed on the resumption selection screen 53), the action plan unit 43 repeats step ST34 and step ST35. Namely, the action plan unit 43 repeatedly determines whether the resumption selection operation is performed while causing the touch panel 32 to display the resumption selection screen 53. Incidentally, in a case where a button ("No" in FIG. 5C) for not selecting the resumption of the automatic parking is pressed on the resumption selection screen 53, the action plan unit 43 may cancel (end) the automatic parking.

On the other hand, in a case where the determination in step ST35 is "Yes" (in a case where the resumption selection operation is performed on the resumption selection screen 53), the action plan unit 43 determines whether the driver stops performing the brake operation of the vehicle (step ST36) in the same way as step ST21 described above.

In a case where the determination in step ST36 is "No" (in a case where the driver does not stop performing the brake operation of the vehicle), the action plan unit 43 repeats the determination in step ST36.

On the other hand, in a case where the determination in step ST36 is "Yes" (in a case where the driver stops performing the brake operation of the vehicle), the automatic parking is resumed (step ST37). In a case where the automatic parking is resumed in this way and the obstacle is no longer present on the first target route, the action plan unit 43 resumes traveling of the vehicle along the first target route. In a case where the vehicle keeps on traveling along the first target route and consequently reaches the target position, the display process ends. Accordingly, the driving process also ends.

By the way, even if the automatic parking is resumed in step ST37, the obstacle may still be present on the first target route. In such a case, the action plan unit 43 stands by in a state where the vehicle stops traveling without causing the vehicle to start traveling along the first target route. The driver can cancel the automatic parking at any time by performing an operation for selecting the cancelation (end) of the automatic parking on the touch panel 32 or the parking main switch 34.

Returning to step ST31 of the display process, in a case where the determination in step ST31 is "No" (in a case where the non-performance period does not continue for the prescribed period T or more), the external environment recognizing unit 41 determines whether the obstacle is present on the first target route (step ST38) in the same way as step ST12 described above.

In a case where the determination in step ST38 is "Yes" (in a case where the obstacle is present on the first target route), the action plan unit 43 again determines whether the non-performance period continues for the prescribed period T or more (step ST31). Incidentally, even if the external environment sensor 7 keeps on detecting the obstacle on the first target route and thus the determination in step ST38 becomes "Yes", the action plan unit 43 prohibits a notification about the presence of the obstacle on the first target route (an example of a notification about the automatic parking) while the determination in step ST31 remains "No" (namely, while the driver performs the brake operation of the vehicle). Namely, the action plan unit 43 does not cause the touch panel 32 to display a message notifying the presence of the obstacle on the first target route. Also, the action plan unit 43 does not cause the sound generating device 33 to generate voice guidance notifying the presence of the obstacle on the first target route.

On the other hand, in a case where the determination in step ST38 is "No" (in a case where the obstacle is not present on the first target route), the action plan unit 43 determines whether the driver stops performing the brake operation of the vehicle (step ST36). As described above, in a case where the determination in step ST36 is "No", the action plan unit 43 repeats the determination in step ST36. On the other hand, in a case where the determination in step ST36 becomes "Yes", the automatic parking is resumed (step ST37).

<Effect>

As described above, upon succeeding in calculating the second target route, the action plan unit 43 causes the touch panel 32 to display the traveling direction image corresponding to the second target route (step ST17). On the other hand, upon failing to calculate the second target route, the action plan unit 43 causes the touch panel 32 to display the promotion screen 51 on condition that the non-performance period continues for the prescribed period T or more (steps ST31 and ST32). Thus, the touch panel 32 can selectively display either the traveling direction image or the promotion screen 51 depending on the success or failure of the calculation of the second target route. Accordingly, it is possible to appropriately notify the user of the behavior of the vehicle.

Also, as described above, when the vehicle starts traveling along the second target route after stopping traveling along the first target route, the traveling direction of the vehicle is switched in order to move the vehicle away from the obstacle on the first target route. In light of such a situation, upon succeeding in calculating the second target route, the action plan unit 43 causes the touch panel 32 to display the traveling direction image in the direction opposite to the traveling direction of the vehicle immediately before the vehicle stops traveling along the first target route (step ST17). Thus, the touch panel 32 can display an appropriate traveling direction image in consideration of the above switch in the traveling direction of the vehicle. Accordingly, it is possible to prompt the user to monitor the surroundings of the vehicle, and to improve the safety of the vehicle accordingly.

Also, upon succeeding in calculating the second target route, the action plan unit 43 causes the vehicle to start traveling along the second target route at least on condition that the user performs the brake operation of the vehicle (steps ST18 and ST22). Thus, it is possible to cause the vehicle to start traveling along the second target route after the user performs the brake operation of the vehicle. Accordingly, the user can easily predict that the vehicle will travel along the second target route.

Also, upon failing to calculate the second target route, the action plan unit 43 makes a determination as to a performance state of the brake operation of the vehicle by the user (step ST31). Thus, the action plan unit 43 can perform appropriate control according to the performance state of the brake operation of the vehicle by the user. Accordingly, it is possible to improve the safety of the vehicle.

Also, upon failing to calculate the second target route, the action plan unit 43 prohibits the notification about the presence of the obstacle on the first target route while the user is performing the brake operation of the vehicle (steps ST31 and ST38). Thus, it is possible to prevent the notification about the presence of the obstacle on the first target route from being given even though the user is aware of the obstacle on the first target route, thereby preventing the user from being annoyed.

Also, in a case where the non-performance period continues for the prescribed period T or more, the user may not be monitoring the surroundings of the vehicle even though the obstacle is present on the first target route. In light of such a situation, in a case where the non-performance period continues for the prescribed period T or more, the action plan unit 43 causes the touch panel 32 to display the promotion screen 51 (steps ST31 and ST32). Thus, it is possible to improve the safety of the vehicle. Further, the promotion screen 51 is displayed on condition that the non-performance period continues for the prescribed period T or more (namely, the user does not perform the brake operation for the prescribed period T or more), thereby preventing the promotion screen 51 from being displayed at an excessively early timing after the user stops performing the brake operation. Accordingly, it is possible to more effectively prevent the user from being annoyed.

Further, in a case where the user performs the brake operation of the vehicle in response to the promotion screen 51, the action plan unit 43 causes the touch panel 32 to display the resumption selection screen 53 (steps ST32 and ST34). Accordingly, it is possible to resume the automatic parking based on the user's intention, thereby improving the safety of the vehicle.

Further, in a case where the action plan unit 43 determines that the non-performance period does not continue for the prescribed period T or more and the external environment sensor 7 no longer detects the obstacle on the first target route, the action plan unit 43 resumes the automatic parking on condition that the user stops performing the brake operation of the vehicle (steps ST31 and ST36 to ST38). Thus, it is possible to resume the automatic parking without resetting the target route, and to improve the convenience of the user accordingly.

MODIFICATION

In the present embodiment, upon succeeding in calculating the second target route, the action plan unit 43 causes the vehicle to start traveling along the second target route on condition that the user performs the brake operation of the vehicle (see FIG. 4). On the other hand, in another embodiment, upon succeeding in calculating the second target route, the action plan unit 43 may cause the vehicle to start traveling along the second target route regardless of whether the user has performed the brake operation of the vehicle (see FIG. 7). Namely, in another embodiment, the action plan unit 43 may proceed to step ST21 after the abovementioned step ST17 without performing steps ST18 to ST20. Thus, it is possible to cause the vehicle to start traveling along the second target route without causing the user to perform the brake operation of the vehicle. Accordingly, it is possible to improve the convenience of the user.

In the present embodiment, the touch panel 32 mounted on the vehicle is cited as an example of the display unit. In another embodiment, a communication device (for example, a smartphone, a tablet PC, a mobile phone, a PDA, or the like) configured to communicate with the vehicle may be cited as an example of the display unit. Namely, the display unit is not necessarily mounted on the vehicle.

In the present embodiment, the driver is cited as an example of the user. On the other hand, in another embodiment, the occupant other than the driver may be cited as an example of the user, or a person other than the occupant (a person outside the vehicle) may be cited as an example of the user.

Concrete embodiments of the present invention have been described in the foregoing, but the present invention should not be limited by the foregoing embodiments and various modifications and alterations are possible within the scope of the present invention.

The invention claimed is:

1. A parking assist system configured to execute automatic parking for autonomously moving a vehicle to a target position, the parking assist system comprising:
   an acquiring unit configured to acquire surrounding information about surroundings of the vehicle;
   a display unit configured to display the surrounding information acquired by the acquiring unit; and
   a control unit configured to calculate a first target route to the target position based on the surrounding information acquired by the acquiring unit and to cause the vehicle to travel along the first target route,
   wherein in a case where the acquiring unit acquires information about an obstacle on the first target route during traveling of the vehicle along the first target route and thus the vehicle stops traveling along the first target route, the control unit tries to calculate a second target route to the target position from a position where the vehicle stops traveling along the first target route, and
   upon the control unit failing to calculate the second target route, in the case where the acquiring unit acquires the information about the obstacle on the first target route, and while a user is performing a brake operation of the vehicle, the control unit prohibits a notification about presence of the obstacle on the first target route.

2. The parking assist system according to claim 1, wherein upon failing to calculate the second target route, the control unit gives the notification about the presence of the obstacle on the first target route at least on condition that the user is not performing the brake operation of the vehicle.

3. A parking assist system configured to execute automatic parking for autonomously moving a vehicle to a target position, the parking assist system comprising:
   an acquiring unit configured to acquire surrounding information about surroundings of the vehicle;
   a display unit configured to display the surrounding information acquired by the acquiring unit; and
   a control unit configured to calculate a first target route to the target position based on the surrounding information acquired by the acquiring unit and to cause the vehicle to travel along the first target route,
   wherein in a case where the acquiring unit acquires information about an obstacle on the first target route during traveling of the vehicle along the first target route and thus the vehicle stops traveling along the first target route, the control unit tries to calculate a second target route to the target position from a position where the vehicle stops traveling along the first target route,
   upon failing to calculate the second target route, the control unit prohibits a notification about the automatic parking while a user is performing a brake operation of the vehicle and gives the notification about the automatic parking at least on condition that the user is not performing the brake operation of the vehicle,
   upon failing to calculate the second target route, the control unit determines whether a non-performance period during which the user does not perform the brake operation of the vehicle continues for a prescribed period or more, and
   upon determining that the non-performance period continues for the prescribed period or more, the control unit gives the notification about the automatic parking.

4. The parking assist system according to claim 3, wherein upon determining that the non-performance period continues for the prescribed period or more, the control unit gives a promotion notification as the notification about the automatic parking, the promotion notification promoting the brake operation of the vehicle.

5. The parking assist system according to claim 4, wherein in a case where the user performs the brake operation of the vehicle in response to the promotion notification, the control unit gives a resumption selection notification in which the user can select resumption of the automatic parking.

6. A parking assist system configured to execute automatic parking for autonomously moving a vehicle to a target position, the parking assist system comprising:
   an acquiring unit configured to acquire surrounding information about surroundings of the vehicle;
   a display unit configured to display the surrounding information acquired by the acquiring unit; and
   a control unit configured to calculate a first target route to the target position based on the surrounding information acquired by the acquiring unit and to cause the vehicle to travel along the first target route,
   wherein in a case where the acquiring unit acquires information about an obstacle on the first target route during traveling of the vehicle along the first target route and thus the vehicle stops traveling along the first target route, the control unit tries to calculate a second target route to the target position from a position where the vehicle stops traveling along the first target route, upon failing to calculate the second target route, the control unit prohibits a notification about the automatic parking while a user is performing a brake operation of the vehicle, upon failing to calculate the second target route, the control unit determines whether a non-performance period during which the user does not perform the brake operation of the vehicle continues for a prescribed period or more, and in a case where the control unit determines that the non-performance period does not continue for the prescribed period or more and the acquiring unit stops acquiring the information about the obstacle on the first target route, the control unit resumes the automatic parking at least on condition that the user stops performing the brake operation of the vehicle.

7. The parking assist system according to claim 1, wherein even if the control unit fails to calculate the second target route and the acquiring unit keeps on acquiring the information about the obstacle on the first target route, the control unit prohibits the notification about the presence of the obstacle on the first target route while the user is performing the brake operation of the vehicle.

* * * * *